(12) United States Patent
Sawai

(10) Patent No.: US 7,337,417 B2
(45) Date of Patent: Feb. 26, 2008

(54) METHOD OF SUPPORTING WIRING DESIGN, SUPPORTING APPARATUS USING THE METHOD, AND COMPUTER-READABLE RECORDING MEDIUM

(75) Inventor: Masayoshi Sawai, Kosai (JP)

(73) Assignee: Yazaki Corporation, Tokyo (JP)

( * ) Notice: Subject to any disclaimer, the term of this patent is extended or adjusted under 35 U.S.C. 154(b) by 390 days.

(21) Appl. No.: 11/082,857

(22) Filed: Mar. 18, 2005

(65) Prior Publication Data
US 2005/0209729 A1 Sep. 22, 2005

(30) Foreign Application Priority Data
Mar. 19, 2004 (JP) ............ P 2004-080037

(51) Int. Cl.
*G06F 17/50* (2006.01)
(52) U.S. Cl. ............ 716/4; 716/5
(58) Field of Classification Search ............ 716/3–6, 716/2
See application file for complete search history.

(56) References Cited

U.S. PATENT DOCUMENTS

| 7,089,516 | B2 * | 8/2006 | Arora et al. ............ 716/4 |
| 7,124,069 | B2 * | 10/2006 | Meuris et al. ............ 703/13 |
| 7,133,810 | B2 * | 11/2006 | Butler et al. ............ 703/2 |
| 2002/0029135 | A1 | 3/2002 | Hollig et al. |

FOREIGN PATENT DOCUMENTS

| EP | 1 130 527 A2 | 9/2001 |
| EP | 1 275 565 A1 | 1/2003 |
| JP | 2004-139570 A | 5/2004 |
| JP | 2004-139974 A | 5/2004 |

OTHER PUBLICATIONS

Matrix Finite Element Method, pp. 7-15, B. Nath, translated by Takashi Yokoyama, Aug. 10, 1978, Brian Books Publishing Co., Ltd.
Mode Analysis and Dynamic Design, pp. 54-56, Kimihiko Yasuda, Corona Publishing Co., Ltd., Nov. 10, 1993.
Analysis of Frame Structures, pp. 176-185, Buildling Structures Analysis Series II, Sukenobu Tani, Dec. 20, 1976, Gihodo Shuppan Co., Ltd.

* cited by examiner

*Primary Examiner*—Jack Chiang
*Assistant Examiner*—Binh Tat
(74) *Attorney, Agent, or Firm*—Sughrue Mion, PLLC

(57) ABSTRACT

A supporting apparatus for supporting an optimum wiring design of a linear structure includes a providing unit which provides a finite element model of the linear structure, the finite element model being formed as an elastic body having a plurality of combined beam elements which retain linearity, a setting unit which sets a physical property and restriction conditions of the linear structure to the finite element model, a first calculating unit which calculates a predictive shape of the finite element model which is in a physically balanced condition based on the physical property and the restriction conditions; a second calculating unit which calculates a reaction at a predetermined evaluation point of the predictive shape, a comparing unit which compares the reaction with a predetermined threshold value, and an outputting unit which outputs a comparison result by the comparing unit. The first calculating unit calculates the predictive shape by setting a forced displacement destination of a predetermined control point of the linear structure as one of the restriction conditions, to the finite element model.

12 Claims, 11 Drawing Sheets

FIG. 2

| DEGREE OF FREEDOM OF RESTRICTIONS / SUPPORT MEMBER | | TRANSLATION IN THE DIRECTION OF X-AXIS | TRANSLATION IN THE DIRECTION OF Y-AXIS | TRANSLATION IN THE DIRECTION OF Z-AXIS | ROTATION AROUND X-AXIS | ROTATION AROUND Y-AXIS | ROTATION AROUND Z-AXIS |
|---|---|---|---|---|---|---|---|
| COMPLETE RESTRICTION | CONNECTOR | IMPOSSIBLE | IMPOSSIBLE | IMPOSSIBLE | IMPOSSIBLE | IMPOSSIBLE | IMPOSSIBLE |
| COMPLETE RESTRICTION | ELONGATED HOLE CLIP | IMPOSSIBLE | IMPOSSIBLE | IMPOSSIBLE | IMPOSSIBLE | IMPOSSIBLE | IMPOSSIBLE |
| ROTARY RESTRICTION | ROUND HOLE CLIP | IMPOSSIBLE | IMPOSSIBLE | IMPOSSIBLE | IMPOSSIBLE | IMPOSSIBLE | POSSIBLE |
| ROTARY RESTRICTION | CORRUGATED ELONGATED HOLE CLIP | IMPOSSIBLE | IMPOSSIBLE | IMPOSSIBLE | POSSIBLE | IMPOSSIBLE | IMPOSSIBLE |
| ROTARY RESTRICTION | CORRUGATED ROUND HOLE CLIP | IMPOSSIBLE | IMPOSSIBLE | IMPOSSIBLE | POSSIBLE | IMPOSSIBLE | POSSIBLE |
| COMPLETE RESTRICTION | BRANCH POINT | POSSIBLE | POSSIBLE | POSSIBLE | POSSIBLE | POSSIBLE | POSSIBLE |

FIG. 3A
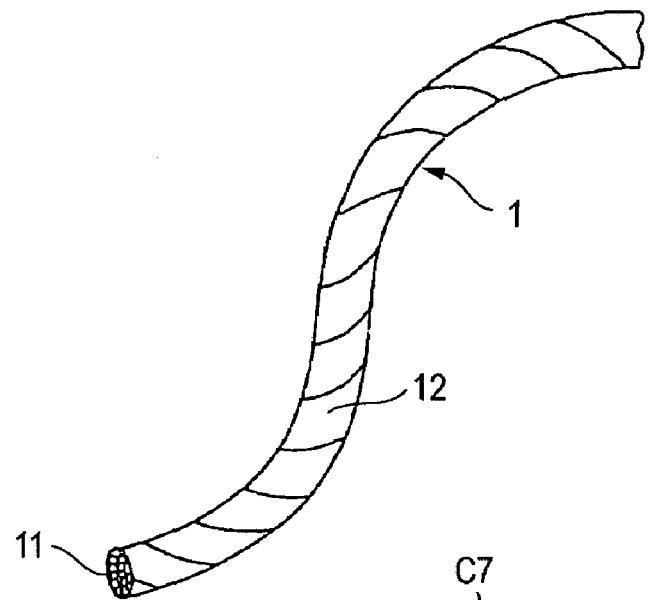
FIG. 3B
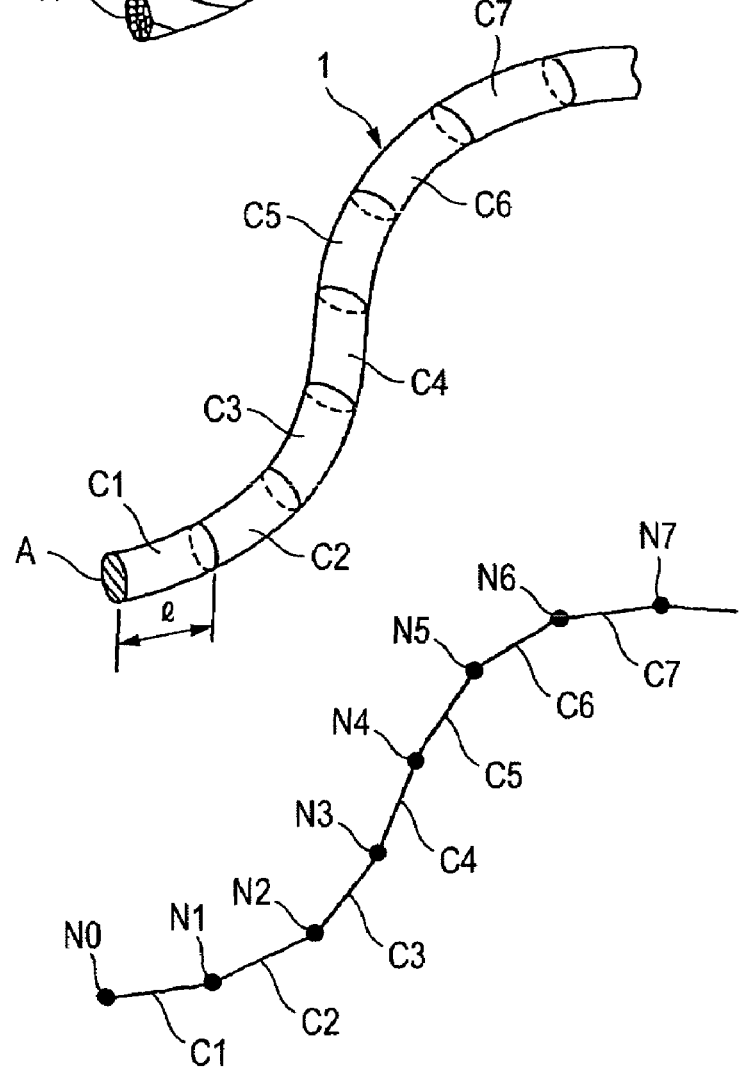
FIG. 3C

FIG. 6A
FIG. 6B
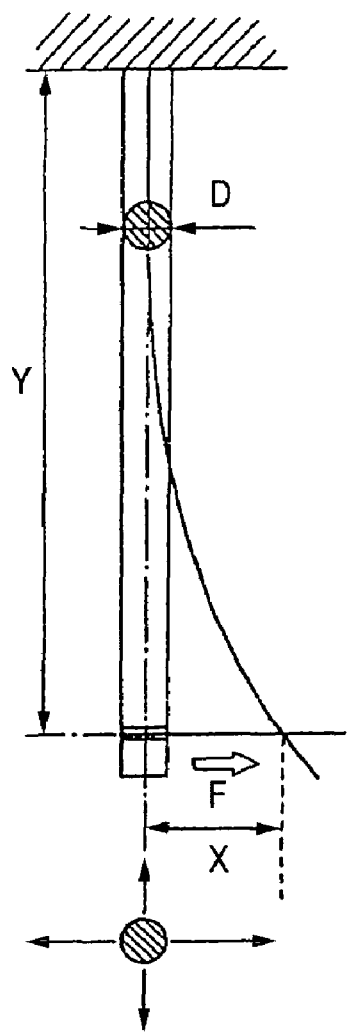
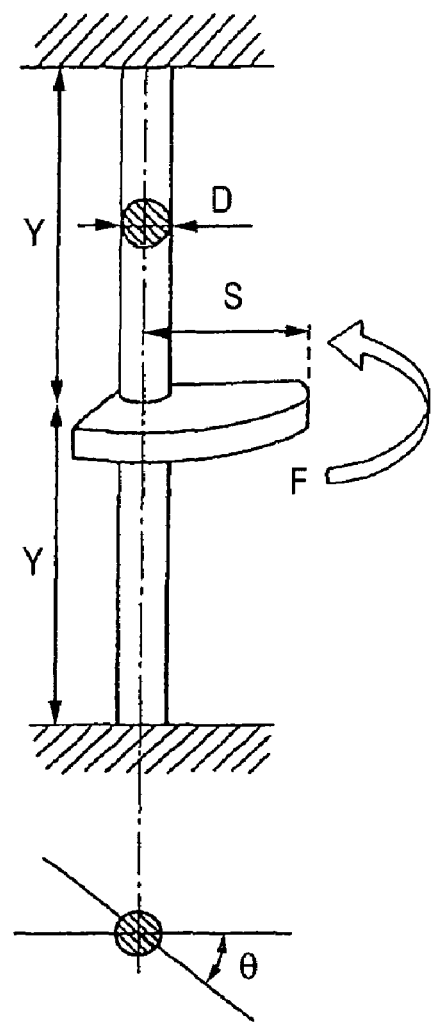

1a2 — EVALUSION POINT
1a8 — CONTROL POINT

1a2' --- EVALUSION POINT
1a8' --- CONTROL POINT

METHOD OF SUPPORTING WIRING DESIGN, SUPPORTING APPARATUS USING THE METHOD, AND COMPUTER-READABLE RECORDING MEDIUM

BACKGROUND OF THE INVENTION

The present invention relates to a method of supporting a wiring design of a linear structure, such as a wire harness, a supporting apparatus using the method, and a computer-readable recording medium.

A vehicle and the like is mounted with a plurality of electric parts, which are connected together by a so-called wire harness as a linear structure in which a plurality of linear members, such as electric wires, communication wires and the like are bundled in a binding member, such as an insulating lock and the like, and an outer armoring member, such as a tape. As shown in FIG. 1, connectors $2a$, $2b$, $2c$, $2d$ joined to electric parts and the like are provided at end portions of a wire harness 1. Also, various kinds of clips $3a$, $3b$, $3c$, $3d$, and a branch point 4 are provided at intermediate portions of the wire harness. The branch lines of the wire harness 1, which form the sections of the wire harness 1 which extend from the end portions thereof to the branch point 4, have basically different number and kinds of structural filament members. Therefore, the thickness, length, density and the like of the branch lines are various.

The design for wiring such a wire harness in a vehicle and the like has been made in many cases by making calculations by using multipurpose analytic software called CAD (Computer Aided Design) and CAE (Computer Aided Engineering), or on the basis of a designer's experience and perception. However, since a linear structure, such as a wire harness and the like is diverse, merely using the multipurpose analytic software and merely relying upon a designer's experience do not meet the purpose, i.e., it is very difficult to design the linear structure by accurately anticipating the rigidity of the linear structure with respect to the bend and distortion of each portion thereof.

Under the above circumstances, the applicant of the present invention proposed by JP-A-2004-139974 and JP-A-2004-139570, and so forth a method of supporting an optimum wiring design by calculating a predictive shape of a linear structure with the physical property of a linear structure, such as a wire harness, i.e. a material thereof and the rigidity thereof with respect to the bend and distortion of each portion thereof taken into consideration, and by displaying the condition of the linear structure of gradual variation of from an initial shape to a predictive shape thereof, by utilizing a finite element process.

Here, the documents cited in the specification of the present invention will now be shown below.

JP-A-2004-139974

JP-A-2004-139570

"Matrix Finite Element Process" written by B. Nass, published by the Brain Book Publishing Co., Ltd., Aug. 10, 1978, p. 7 to 15.

"Mode Analysis and Dynamic Design" written by Hitohiko Yasuda, issued by the Corona Co., Ltd., Nov. 10, 1993, p. 54 to 56.

The methods described in JP-A-2004-139974 and JP-A-2004-139570 are extremely excellent in that it is possible to precisely predict and calculate the distortion, stress and reaction which occur when the linear structure is deformed while applying a predetermined force to a predetermined control point or when the control point is forcibly displaced to a predetermined position. Nevertheless, it is found that the methods of JP-A-2004-139974 and JP-A-2004-139570 have room for further improvement.

In the methods of JP-A-2004-139974 and JP-A-2004-139570, what is merely displayed is the reaction or the like, which occur at a predetermined evaluation point in the predictive shape. It is, therefore, necessary to separately evaluate the reaction to be practically determined or the force to be applied. Specifically, it is necessary to separately perform the working improvement considering the reaction and the predictive shape, the mountability evaluation of the support member such as the connector, and the durability evaluation of the support member attached.

SUMMARY OF THE INVENTION

In view of the current practice thus far described, therefore, the invention has an object to provide a method of supporting wiring design capable of enhancing the conveniences and efficiently designing the optimum wiring of an objective linear structure, and an apparatus and computer-readable recording medium therefor.

In order to achieve the above object, according to the present invention, there is provided a method of supporting an optimum wiring design of a linear structure, comprising:

providing a finite element model of the linear structure, the finite element model being formed as an elastic body having a plurality of combined beam elements which retain linearity;

setting a physical property and restriction conditions of the linear structure to the finite element model;

calculating a predictive shape of the finite element model which is in a physically balanced condition based on the physical property and the restriction conditions;

calculating a reaction at a predetermined evaluation point of the predictive shape;

comparing the reaction with a predetermined threshold value; and outputting a comparison result of the reaction comparing process, wherein the calculating process of the predictive shape calculates the predictive shape by setting a forced displacement destination of a predetermined control point of the linear structure as one of the restriction conditions, to the finite element model.

According to the present invention, there is also provided a method of supporting an optimum wiring design of a linear structure, comprising:

providing a finite element model of the linear structure, the finite element model being formed as an elastic body having a plurality of combined beam elements which retain linearity;

setting a physical property and restriction conditions of the linear structure to the finite element model;

calculating a predictive shape of the finite element model which is in a physically balanced condition based on the physical property and the restriction conditions;

calculating a reaction at a predetermined evaluation point of the predictive shape;

comparing the reaction with a predetermined threshold value; and outputting a comparison result of the reaction comparing process, wherein the calculating process of the predictive shape calculates the predictive shape by setting the magnitude and direction of a force which is applied to a predetermined control point of the linear structure, in addition to the physical property and the restriction conditions, to the finite element model.

Preferably, the outputting process outputs the predictive shape in a state that the reaction coincides with the threshold value as the comparison result.

Preferably, the evaluation point coincides with the control point.

Preferably, the outputting process outputs the force which is applied to the predetermined control point of the linear structure in a state that the reaction coincides with the threshold value as the comparison result.

Preferably, the method further includes an adjusting process which applies the force to the control point so as to change the magnitude of the force gradually while keeping the direction of the force constant.

According to the present invention, there is also provided a supporting apparatus for supporting an optimum wiring design of a linear structure, comprising:

a providing unit which provides a finite element model of the linear structure, the finite element model being formed as an elastic body having a plurality of combined beam elements which retain linearity;

a setting unit which sets a physical property and restriction conditions of the linear structure to the finite element model;

a first calculating unit which calculates a predictive shape of the finite element model which is in a physically balanced condition based on the physical property and the restriction conditions;

a second calculating unit which calculates a reaction at a predetermined evaluation point of the predictive shape;

a comparing unit which compares the reaction with a predetermined threshold value; and an outputting unit which outputs a comparison result by the comparing unit, wherein the first calculating unit calculates the predictive shape by setting a forced displacement destination of a predetermined control point of the linear structure as one of the restriction conditions, to the finite element model.

According to the present invention, there is also provided a supporting apparatus for supporting an optimum wiring design of a linear structure, comprising:

a providing unit which provides a finite element model of the linear structure, the finite element model being formed as an elastic body having a plurality of combined beam elements which retain linearity;

a setting unit which sets a physical property and restriction conditions of the linear structure to the finite element model;

a first calculating unit which calculates a predictive shape of the finite element model which is in a physically balanced condition based on the physical property and the restriction conditions;

a second calculating unit which calculates a reaction at a predetermined evaluation point of the predictive shape;

a comparing unit which compares the reaction with a predetermined threshold value; and an outputting unit which outputs a comparison result by the comparing unit, wherein the first calculating unit calculates the predictive shape by setting the magnitude and direction of a force which is applied to a predetermined control point of the linear structure, in addition to the physical property and the restriction conditions, to the finite element model.

According to the present invention, there is also provided computer-readable recording medium for causing a computer to execute the method of supporting an optimum wiring design of a linear structure set forth in any one of above features.

According to the above invention, a finite element model of an objective linear structure is created; a predictive shape according to the physical properties of the linear structure and the restriction conditions including the forced displacement destination of a control point, which are given to that finite element model, are calculated; the reaction at a predetermined evaluation point of the predictive shape is calculated. This reaction is compared with a predetermined threshold value, and the comparison result is outputted. With reference to the comparison result, it is easily possible to grasp the moving range of the control point, to decide the mountability of the support member on the evaluation point, and to evaluate the durability of the support member to be attached to the evaluation point.

According to the above invention, a finite element model of an objective linear structure is created; a predictive shape according to the physical properties of the linear structure and the restriction conditions, which are given to that finite element model, and the predictive shape according to the magnitude and direction of the force applied to a predetermined control point are calculated; the reaction at a predetermined evaluation point of the predictive shape is calculated. This reaction is compared with a predetermined threshold value, and the comparison result is outputted. With reference to the comparison result, it is possible to easily grasp the moving range of the control point, to decide the mountability of the support member on the evaluation point, and to evaluate the durability of the support member to be attached to the evaluation point.

According to the above invention, moreover, the predictive shape at the time when the reaction is deemed to coincide with the threshold value is outputted. It is, therefore, possible to easily grasp the predictive shape corresponding to the durability limit of the support member to be attached to the evaluation point.

According to the above invention, moreover, the evaluation point and the control point coincide with each other. It is, therefore, possible to easily grasp the moving range of the support member to be attached to the desired position, and to decide the mountability of the support member.

According to the above invention, moreover, the force given to the control point at the time when the reaction is deemed to coincide with the threshold value, is outputted. It is, therefore, possible to easily grasp the force which can be applied to the control point, while satisfying the durable range of the support member to be attached to the evaluation point.

According to the above invention, moreover, the force is given to the control point by changing the magnitude of the force gradually while keeping the direction of the force constant. It is, therefore, possible to continuously grasp the relation between the force to be applied to the control point and the reaction to occur at the evaluation point.

According to the above invention, a finite element model of an objective linear structure is created; a predictive shape according to the physical properties of the linear structure and the restriction conditions including the forced displacement destination of a control point, which are given to that finite element model, are calculated; the reaction at a predetermined evaluation point of the predictive shape is calculated. This reaction is compared with a predetermined threshold value, and the comparison result is outputted. With reference to the comparison result, it is easily possible to grasp the moving range of the control point, to decide the mountability of the support member on the evaluation point, and to evaluate the durability of the support member to be attached to the evaluation point. It is, therefore, possible to efficiently desire the optimum wiring of the objective linear structure.

According to the above invention, a finite element model of an objective linear structure is created; a predictive shape according to the physical properties of the linear structure and the restriction conditions, which are given to that finite element model, and the predictive shape according to the magnitude and direction of the force applied to a predetermined control point are calculated; the reaction at a predetermined evaluation point of the predictive shape is calculated. This reaction is compared with a predetermined threshold value, and the comparison result is outputted. With reference to the comparison result, it is possible to easily grasp the moving range of the control point, to decide the mountability of the support member on the evaluation point, and to evaluate the durability of the support member to be attached to the evaluation point. It is, therefore, possible to efficiently desire the optimum wiring of the objective linear structure.

According to the above invention, moreover, the predictive shape at the time when the reaction is deemed to coincide with the threshold value is outputted. It is, therefore, possible to easily grasp the predictive shape corresponding to the durability limit of the support member to be attached to the evaluation point. It is, therefore, possible to efficiently desire the optimum wiring of the objective linear structure.

According to the above invention, moreover, the evaluation point and the control point coincide with each other. It is, therefore, possible to easily grasp the moving range of the support member to be attached to the desired position, and to decide the mountability of the support member. It is, therefore, possible to efficiently desire the optimum wiring of the objective linear structure.

According to the above invention, moreover, the force given to the control point at the time when the reaction is deemed to coincide with the threshold value, is outputted. It is, therefore, possible to easily grasp the force which can be applied to the control point, while satisfying the durable range of the support member to be attached to the evaluation point. It is, therefore, possible to efficiently desire the optimum wiring of the objective linear structure.

According to the above invention, moreover, the force is given to the control point by changing the magnitude of the force gradually while keeping the direction of the force constant. It is, therefore, possible to continuously grasp the relation between the force to be applied to the control point and the reaction to occur at the evaluation point. It is, therefore, possible to efficiently desire the optimum wiring of the objective linear structure.

BRIEF DESCRIPTION OF THE DRAWINGS

The above objects and advantages of the present invention will become more apparent by describing in detail preferred exemplary embodiments thereof with reference to the accompanying drawings, wherein:

FIG. 2 is a diagram showing relations between representative support members to be attached to the wire harness and the degrees of freedom from restrictions;

FIG. 3A is a diagram showing the appearance of the wire harness, FIG. 3B is a diagram showing a discrete behavior of the wire harness of FIG. 3A, and FIG. 3C is a diagram expressing the wire harness of FIG. 3A with beam elements and joints;

FIG. 6A is a diagram showing the behavior for measuring the geometrical moment of inertia and the modulus of longitudinal elasticity, and FIG. 6B is a diagram showing the behavior for measuring the polar moment of inertia of area and the modulus of transverse elasticity;

DETAILED DESCRIPTION OF THE PREFERRED EMBODIMENTS

Figure 1:
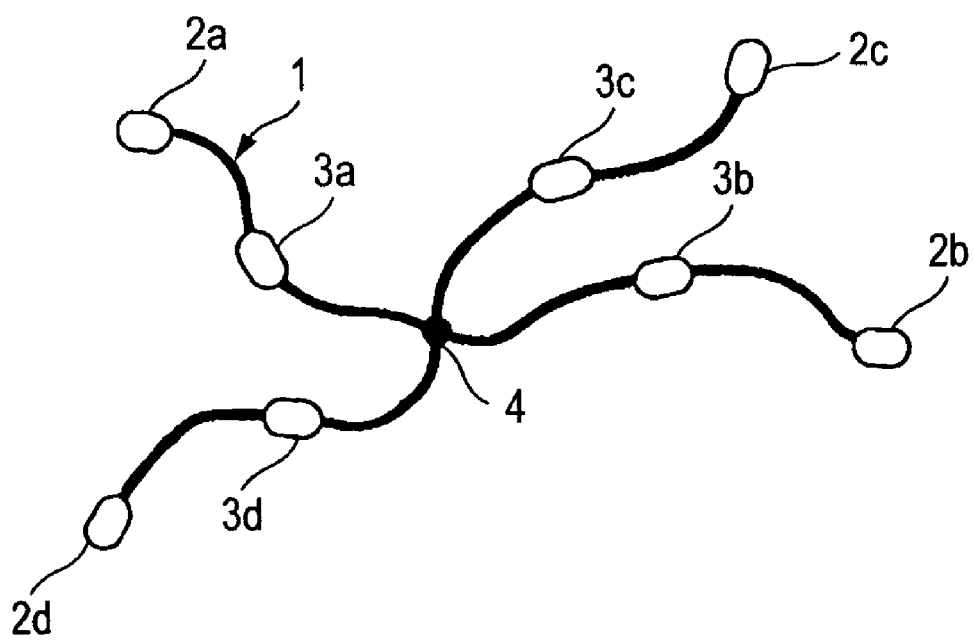
FIG. 1 is a diagram showing an example of an objective wire harness schematically.

The embodiments of the present invention will now be described on the basis of the drawings. First, an example of a wire harness as an object linear structure and a typical support member will be described in FIG. 1 and FIG. 2. FIG. 1 is a drawing schematically showing an example of an object wire harness. FIG. 2 is a diagram showing the relation between typical support members fixed to the wire harness and the degree of freedom of restrictions.

Connectors 2a, 2b, 2c, 2d for connecting electric parts (not shown) are mounted at both end portions of the wire harness 1. Various kinds of clips 3a, 3b, 3b, 3c are mounted to intermediate portions of the wire harness 1, which further has a branch point 4. Since the branch lines of the wire harness 1 have basically different number and kind of structural filament members, the thickness, length, elasticity, density and the like thereof are also different.

The connectors 2a, 2b, 2c, 2d are detachably joined to fixed portions and predetermined portions, which are in accordance with the part fixing direction, of connectors on the side of an electric part, and the end portions of the wire harness are thereby completely restricted. The clips 3a, 3b, 3c, 3e completely restrict or rotationally restrict predetermined portions of the wire harness with respect to predetermined portions of a body and a stay of a vehicle.

A description of the clips will now be added. The clips basically include an elongated hole clip, and a round hole clip. A round hole clip is also called a rotary clip, and has a base seat portion for retaining the wire harness, and a support leg inserted into a round fixing hole provided in a stay and the like. The round hole clip can be rotated around a Z-axis (perpendicular direction of a fixing portion).

The elongated hole clip is also called a fixed clip, and has a base seat portion for retaining the wire harness, and a support leg inserted into an elongated fixing hole provided in a stay and the like. This support leg has an elongated hole-like cross-sectional shape substantially identical with the cross-sectional shape of the fixing hole. The elongated hole clip is non-rotatable around the Z-axis.

The elongated hole clips and round hole clips include corrugated elongated hole clips rotatable around an X-axis (longitudinal direction of the wire harness), and corrugated round hole clips. The degrees of freedom of restriction in the axial directions and in the directions around the axes of such clips are as shown in FIG. 2.

Referring to FIG. 2, the X-axis, Y-axis and Z-axis correspond to three straight lines in a right-hand local coordinate system on joints (or called nodes as well) on the wire harness. For example, the Z-axis is set so that the Z-axis is in alignment with the clip axis. These setting methods can be changed suitably depending upon the functions in use. The drawing also shows for reference the degrees of freedom of restriction of the branch point. A joint, though it is not shown in the drawing, set arbitrarily on the portion of the wire harness which is other than the above-mentioned restriction point is basically completely free. Such a degree of freedom of restriction is set on each joint for making calculations of predictive paths which will be described later.

Figure 4:
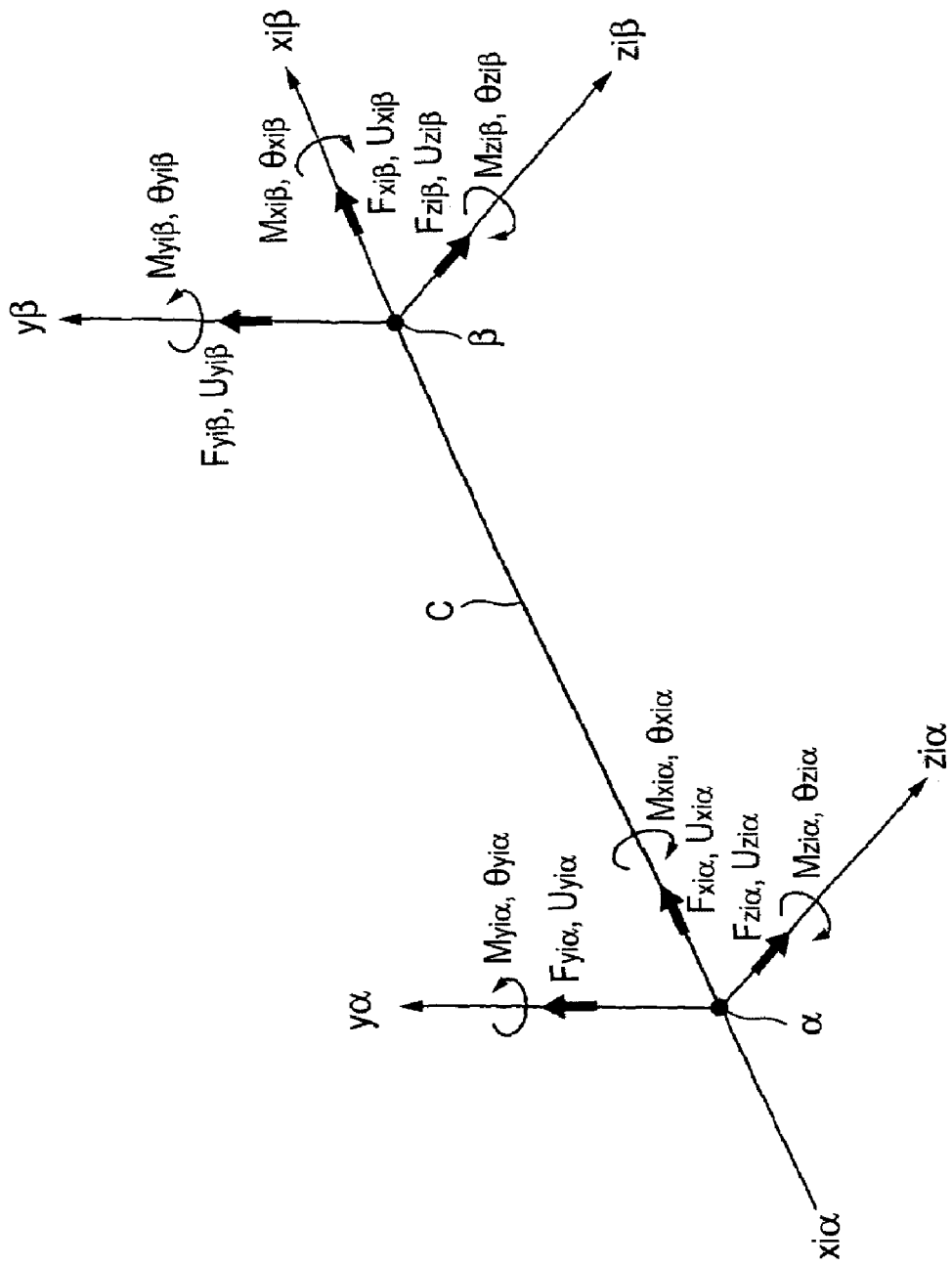
FIG. 4 is a diagram for explaining the degrees of freedom in the wire harness with the beam elements and the joints.
Figures 5A, 5B:
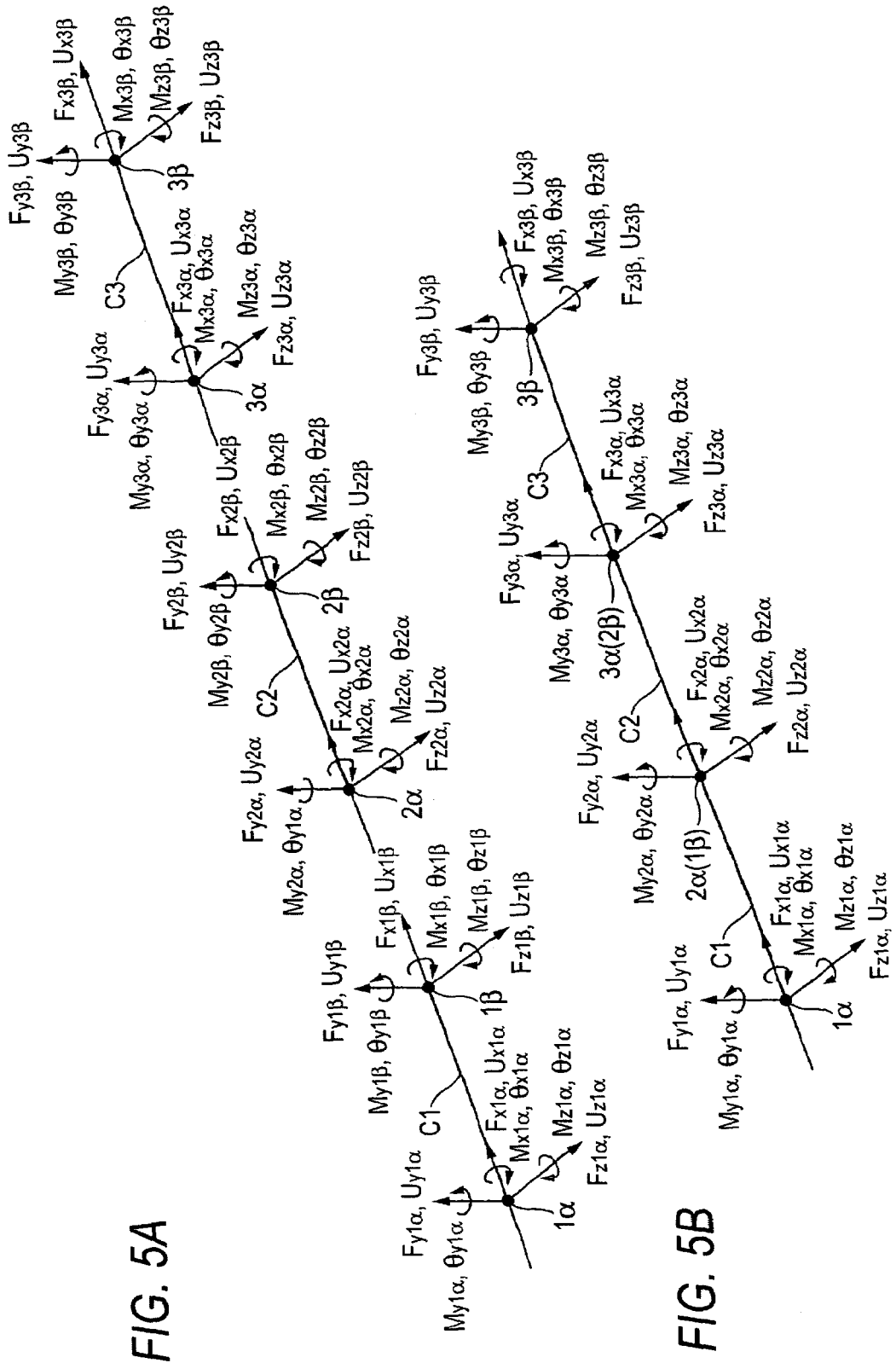
FIG. 5A is a diagram expressing the wire harness with three beam elements.
FIG. 5B is a diagram showing the state, in which the three beam elements are combined.

Referring then to FIG. 3 to FIG. 5, the outlines of the hypothetic conditions constituting the premises of the present invention, theories utilized and basic equations will now be described. FIG. 3A is a drawing showing an external view of a wire harness, FIG. 3B a drawing showing a discrete condition of the wire harness of FIG. 3A, and FIG. 3C a drawing representing the wire harness of FIG. 3A by beam elements and joints. FIG. 4 is a drawing for describing the degree of freedom in the wire harness represented by beam elements and joints. FIG. 5A is a drawing representing the wire harness by three beam elements, and FIG. 5B a drawing showing the condition of the three beam elements of FIG. 5A combined together.

First, according to the present invention, the following hypotheses are built up under use of the finite element method for designing the wire harness.

(1) It is assumed that the wire harness is made of an elastic body.
(2) It is assumed that the wire harness is a combination of beam elements.
(3) It is assumed that each beam element retains the linearity.

Setting the wire harness hypothetically as beam elements means that the wire harness is also set hypothetically as a uniform cross section, i.e. a homogeneous cross section. The cross section is assumed to be circular but it is not always necessary to assume the cross section in this manner. However, in the following statement, a description will be given with the cross section of the wire harness assumed to be circular.

When such a hypothesis is formed, the applying of the finite element method to the wire harness, which has not heretofore been applied thereto, becomes possible.

First, the wire harness is discretized. The wire harness formed by binding a plurality of electric wires 11 by an armoring material, such as a tape 12 as shown in FIG. 3A can be regarded as a continuous body. As shown in FIG. 3B, such a wire harness 1 is divided (discretized) into some beam elements C1, C2, C3, . . . . Namely, the wire harness is like one rope, so that the wire harness can be regarded as finite pieces of connected beam elements.

Therefore, as shown in FIG. 3C, the wire harness can be expressed as a combination of a plurality of beam elements C1, C2, C3, . . . connected to one another by a plurality of nodes N1, N2, N3, . . . . The characteristic values necessary for the beam elements are as follows.

Length l (refer to FIG. 3B)
Cross-sectional area A (refer to FIG. 3B)
Second moment of area I
Second polar moment of area J (also called torsional resistance coefficient)
Longitudinal elastic modulus E
Lateral elastic modulus G In order to determine these values, a density $\rho$ and a Poisson's ratio $\mu$, etc. are also used, though they are not directly shown in these characteristic values.

In the specification of the present invention, the parameters concerning the physical properties directly determining an outer shape of a linear structure are called outer shape parameters, and the parameters concerning the physical properties other than the outer shape parameters, such as the second moment of area I, polar moment of area J, longitudinal elastic modulus E and lateral elastic modulus G, density $\rho$, Poisson's ratio $\mu$, etc. shall be called non-outer shape parameters.

As shown in FIG. 4, each beam element (C1, C2, C3, . . . ) has two nodes $\alpha$ and $\beta$. In the three-dimensional space, the node $\alpha$ has three translational components and three rotational components, so that the node has a total of six degrees of freedom. The same applies to the other node $\beta$. Therefore, the beam element C necessarily has twelve degrees of freedom.

Referring to the drawing, the following reference letters and symbols represent:

$F_{xi}$: Nodal force in an xi axial direction of i-th element
$F_{yi}$: Nodal force in a yi axial direction of i-th element
$F_{zi}$: Nodal force in a zi axial direction of i-th element
$M_{xi}$: End moment around the xi axis of the i-th element (the right-handed screwing direction shall be a positive direction)
$M_{yi}$: End moment around the yi axis of the i-th element (the right-handed screwing direction shall be a positive direction)
$M_{zi}$: End moment around the zi axis of the i-th element (the right-handed screwing direction shall be a positive direction)
$U_{xi}$: Displacement in the xi direction of the i-th element
$U_{yi}$: Displacement in the yi direction of the i-th element
$U_{zi}$: Displacement in the zi direction of the i-th element
$\Theta_{xi}$: Angular displacement around the xi axis of the i-th element (the right-handed screwing direction shall be a positive direction)
$\Theta_{yi}$: Angular displacement around the yi axis of the i-th element (the right-handed screwing direction shall be a positive direction)
$\Theta_{zi}$: Angular displacement around the zi axis of the i-th element (the right-handed screwing direction shall be a positive direction)

$\alpha$ represents a left side node, and the other $\beta$ a right side node.

In the structural mechanics accompanying such a large deformation as that of a wire harness and the like, a balance equation of a finite element method is generally $$([K]+[K_G])\{x\}=\{F\} \tag{1}$$

wherein [K] is a general rigidity matrix, [$K_G$] an overall geometric rigidity matrix, $\{x\}$ a displacement vector, and $\{F\}$ a load vector (also called a force vector).

However, since the equation (1) is algebraically a non-linear simultaneous equation, the equation cannot be solved as it is in a practical numerical analysis. Therefore, an incremental method in which a load value is fractionized and gradually added is necessarily employed (the same applies to a case where forced displacement occurs). In consequence, the balance equation (1) is also expressed by the following incremental system.

$$([K]+[K_G])\{\Delta x\}=\{\Delta F\}-\{R\} \qquad (1)'$$

wherein $\{\Delta F\}$ is a value of load increment, $\{\Delta x\}$ incremental deformation in an incremental step, and $\{R\}$ a correction vector for a load vector.

In each incremental section, calculations are made with the balance equation regarded as a linear equation, and a balancing force ((vector $\{R\}$ in the equation $(1)'$)) occurring during this time is reduced to a level in a tolerance by a method of repetition before a subsequent step is taken. In a series of these algorithms, a known method, for example, a Newton-Raphson method and an arc length method are utilized.

When a forced displacement is designated as in the prediction of a shape, omitting the overall geometric rigidity matrix $[K_G]$ in a second item out of a left side of the balance equation, the results of a good quality are obtained in many cases. The overall geometric rigidity matrix is omitted in this case as well.

The overall rigidity matrix $[K]$ in a first item of a left side of the balance equation is obtained by converting the rigidity matrix of each element, which is rewritten as the coordinate value is changed momentarily in each incremental step, into a coordinate value in an overall coordinate system, and aggregating the values thus obtained. The concrete content of expression of the element rigidity matrix forming a basis is shown in the following equation (2).

The condition of compatibility and that of equilibrium will now be described. As shown in FIG. 5A, the wire harness shall be expressed by three beam elements C1, C2, C3 for simplicity's sake. In this case, the quantity of displacement of a node 1β of the beam element C1 and that of displacement of a node 2α of the beam element C2 become equal, and a force applied to these two nodes is also balanced. For the same reason, the quantities of displacement of the node 2β of the beam element C2 and node 3α of a beam element C3 also become equal, and a force applied to these two nodes is also balanced. Therefore, owing to the continuity of the displacement and the satisfaction of the condition of equilibrium, the beam elements C1 and C2, and the beam elements C2 and C3 can be combined with each other as shown in FIG. 5B.

Referring to the drawings, the following reference letters and symbols represent:

$F_{xi}$: Nodal force in the xi axial direction of the i-th element $F_{yi}$: Nodal force in the yi axial direction of the i-th element $F_{zi}$: Nodal force in the zi axial direction of the i-th element $M_{xi}$: End moment around the xi axis of the i-th element $M_{yi}$: End moment around the yi axis of the i-th element $M_{zi}$: End moment around the zi axis of the i-th element $U_{xi}$: Displacement in the xi axial direction of the i-th element $U_{yi}$: Displacement in the yi axial direction of the i-th element $U_{zi}$: Displacement in the zi axial direction of the i-th element $$\left(\begin{array}{cccccc|cccccc}
\frac{AE}{l} & 0 & 0 & 0 & 0 & 0 & -\frac{AE}{l} & 0 & 0 & 0 & 0 & 0 \\
0 & \frac{12EI_z}{l^3} & 0 & 0 & 0 & \frac{6EI_z}{l^2} & 0 & -\frac{12EI_z}{l^3} & 0 & 0 & 0 & \frac{6EI_z}{l^2} \\
0 & 0 & \frac{12EI_y}{l^3} & 0 & -\frac{6EI_y}{l^2} & 0 & 0 & 0 & -\frac{12EI_y}{l^3} & 0 & -\frac{6EI_y}{l^2} & 0 \\
0 & 0 & 0 & \frac{GJ}{l} & 0 & 0 & 0 & 0 & 0 & -\frac{GJ}{l} & 0 & 0 \\
0 & 0 & -\frac{6EI_y}{l^2} & 0 & \frac{4EI_y}{l} & 0 & 0 & 0 & \frac{6EI_y}{l^2} & 0 & \frac{2EI_y}{l} & 0 \\
0 & \frac{6EI_z}{l^2} & 0 & 0 & 0 & \frac{4EI_z}{l} & 0 & -\frac{6EI_z}{l^2} & 0 & 0 & 0 & \frac{2EI_z}{l} \\
\hline
-\frac{AE}{l} & 0 & 0 & 0 & 0 & 0 & \frac{AE}{l} & 0 & 0 & 0 & 0 & 0 \\
0 & -\frac{12EI_z}{l^3} & 0 & 0 & 0 & -\frac{6EI_z}{l^2} & 0 & \frac{12EI_z}{l^3} & 0 & 0 & 0 & -\frac{6EI_z}{l^2} \\
0 & 0 & -\frac{12EI_y}{l^3} & 0 & \frac{6EI_y}{l^2} & 0 & 0 & 0 & \frac{12EI_y}{l^3} & 0 & \frac{6EI_y}{l^2} & 0 \\
0 & 0 & 0 & -\frac{GJ}{l} & 0 & 0 & 0 & 0 & 0 & \frac{GJ}{l} & 0 & 0 \\
0 & 0 & -\frac{6EI_y}{l^2} & 0 & \frac{2EI_y}{l} & 0 & 0 & 0 & \frac{6EI_y}{l^2} & 0 & \frac{4EI_y}{l} & 0 \\
0 & \frac{6EI_z}{l^2} & 0 & 0 & 0 & \frac{2EI_z}{l} & 0 & -\frac{6EI_z}{l^2} & 0 & 0 & 0 & \frac{4EI_z}{l}
\end{array}\right) \begin{Bmatrix} U_{xi\alpha} \\ U_{yi\alpha} \\ U_{zi\alpha} \\ \theta_{xi\alpha} \\ \theta_{yi\alpha} \\ \theta_{zi\alpha} \\ U_{xi\beta} \\ U_{yi\beta} \\ U_{zi\beta} \\ \theta_{xi\beta} \\ \theta_{yi\beta} \\ \theta_{zi\beta} \end{Bmatrix} = \begin{Bmatrix} F_{xi\alpha} \\ F_{yi\alpha} \\ F_{zi\alpha} \\ M_{xi\alpha} \\ M_{yi\alpha} \\ M_{zi\alpha} \\ F_{xi\beta} \\ F_{yi\beta} \\ F_{zi\beta} \\ M_{xi\beta} \\ M_{yi\beta} \\ M_{zi\beta} \end{Bmatrix} \qquad (2)$$

$\Theta_{xi}$: Angular displacement around the xi axis of the i-th element $\Theta_{yi}$: Angular displacement around the yi axis of the i-th element $\Theta_{zi}$: Angular displacement around the zi axis of the i-th element wherein i=1α, 1β, 2α, 2β, 3α, and 3β.

When the continuity of the displacement and the balance of force in the beam elements C1, C2 and C3 shown in FIG. 5B are shown in the same form as the above-mentioned equation (2), the following equation (3) is obtained.

in the present invention will now be described below. FIG. 6A is a drawing showing the measurement of geometrical moment of inertia and a longitudinal elastic modulus, and FIG. 6B a drawing showing the measurement of a polar moment of area and a lateral elastic modulus.

First, an object wire harness is prepared, and the length l, a cross-sectional area A and a density ρ are determined with calipers, a measure, a gravimeter and the like. The values can then be obtained by simple calculations.

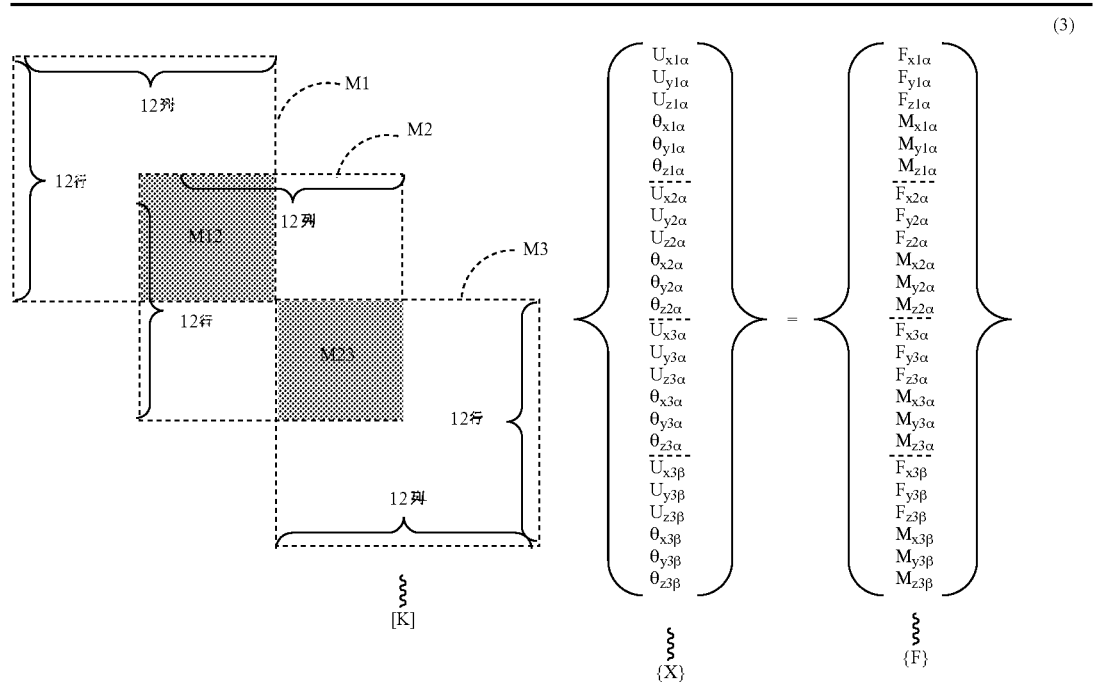

The matrixes M1, M2 and M3 on a line 12 and a column 12 in the equation (3) are the same as that shown in the above equation (2). However, the portions M12 and M23 in which the matrixes M1, M2 and M3 overlap each other are portions in which the structural elements of the matrixes are summed up.

Not smaller than four beam elements can also be handled in the same manner. Thus, a mathematical model of a wire harness divided into an arbitrary number of beam elements can be made.

When the above equation (3) is expressed simply, it becomes $$[K]\{x\}=\{F\} \quad (4)$$

Therefore, a path, i.e. a predictive shape of the wire harness can be calculated by determining each element of the displacement vector $\{x\}$ on the basis of the above equations (3) and (4). The distortion, stress, a reaction force, moment and so forth can be calculated by determining a force vector $\{F\}$ in each node. The general matrix finite element method as mentioned above is also introduced in, for example, the above-mentioned in the publication "Matrix Finite Element Method".

One example of the method of determining a Poisson's ratio, a longitudinal elastic modulus and a lateral elastic modulus which are necessary for the prediction of the shape When the longitudinal elastic modulus E is measured by using the measuring method shown in FIG. 6A, the result can be expressed by the following equation (5).

$$E=FL^3/3XI \quad (5)$$

The geometrical moment of inertia can be expressed by the following equation (6) since it was assumed that the wire harness had a circular cross section as mentioned above.

$$I=\pi D^4/64 \quad (6)$$

Therefore, the equation becomes:

$$E=64FL^3/3X\pi D^4 \quad (7)$$

In this measurement, the longitudinal elastic modulus E can be determined by measuring the relation between F and x with $$E=(F/X)\times(64L^3/3\pi D^4).$$

When the lateral elastic modulus G is determined by using the measuring method shown in FIG. 6B, the result can be expressed by the following equation (8).

$$G=(TL/\Theta J)\times 2 \quad (8)$$

The polar moment of area J can be expressed by the following equation (9) since it was assumed that the wire harness had a circular cross section.

$$J = \pi D^4 / 32 \tag{9}$$

The torsional force becomes:

$$T = FS \tag{10}$$

Therefore, $$G = (32 FSL/\Theta \pi D^4) \times 2 = (F/\Theta)(32 SL/\pi D^4) \times 2 \tag{11}$$

Accordingly, the lateral elastic modulus G can be determined by measuring the relation between F and $\Theta$.

The lateral elastic modulus and longitudinal elastic modulus have the relation shown by the following equation (12).

$$G = E/2 (1+\mu) \tag{12}$$

wherein $\mu$ is a Poisson's ratio.

The above-mentioned measuring method is an example, and each of the lateral elastic modulus G and longitudinal elastic modulus E may also be obtained by a method other than this example of the measuring method.

Figure 7:
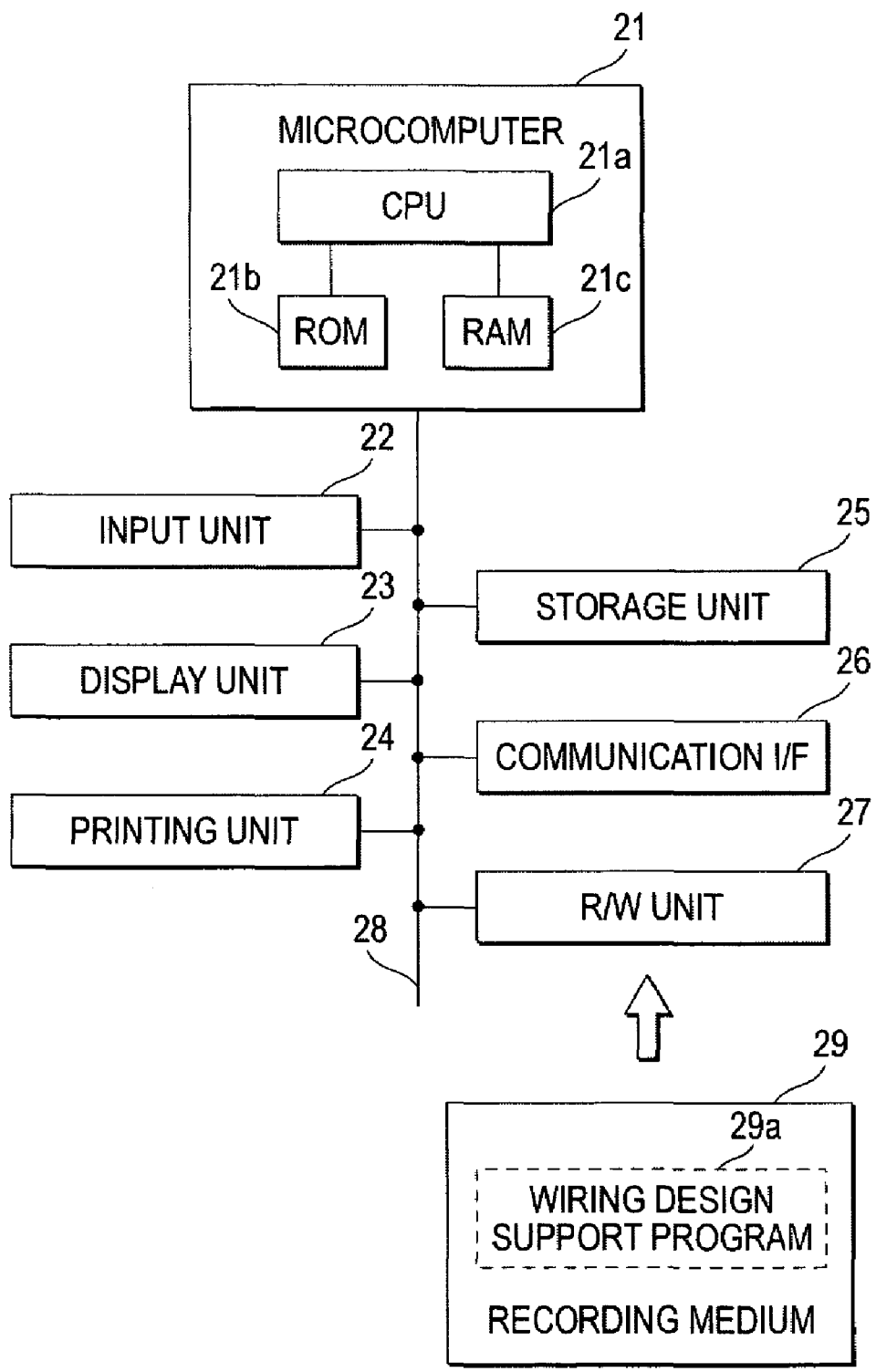
FIG. 7 is a block configuration diagram showing one example of the hardware configuration according to all embodiments of the invention.

The supporting of the design is then done by calculating a predictive shape of the wire harness in accordance with a processing procedure, which will be described later, by utilizing the above theory, basic equations and measurement values. The construction of the hardware in the present invention will be described. FIG. 7 is a block diagram showing the construction of the hardware in all of the modes of embodiments of the present invention.

As shown in FIG. 7, the apparatus according to the present invention includes a microcomputer 21, an input unit 22, a display 23, a printing unit 24, a storage 25, a communication interface 26 and a read/write unit 27. For example, a personal computer is used. Needless to say, a desk top computer and a supercomputer which are other than the personal computer may also be used. The microcomputer 21 includes a CPU 21a (Central Processing Unit), a ROM 21b for storing a boot program, etc., and a RAM 21c for temporarily storing the results of various kinds of processing operations. The input unit 22 is a keyboard, a mouse and the like for inputting the mentioned various values thereinto, the display 23 is a LCD, a CRT and the like for displaying the results of processing operations, and the printing unit 24 a printer for printing the results of processing operations.

The storage 25 stores an installed wiring design support program 29a, i.e. a hard disk drive for storing the results of a process based on this program 29a, while the communication interface 26 is a modem board and the like for making data communication between the communication interface and an external unit by using, for example, internet and a LAN circuit and the like. The read/write unit 27 is a device for reading the wiring design support program 29a stored in a recording medium 29, such as a CD and a DVD, and write the calculation results based on this wiring design support program 29a in the recording medium 29. These structural elements are connected together via an inner bus 28.

The microcomputer 21 installs the wiring design support program 29a read by the read/write unit 27, on the storage 25. When the power is turned ON, the microcomputer 21 is started according to the boot program stored in the ROM 21b, to start the wiring design support program 29a installed. In accordance with the wiring design support program 29a, the microcomputer 21 performs operations for the shape prediction, the reaction calculation and the reaction evaluation, outputs the processed results from the display unit 23 or the print unit 24, and stores the processed results in the storage 25 or the recording medium 29. The wiring design support program 29a can also be installed on another personal computer having the aforementioned basic configuration, and causes, after installed, the computer to function as a wiring design aiding device. Here, the wiring design support program 29a may also be serviced not only from the recording medium 29 but also through the communication lines such as the internet or the LAN.

Here, the theories, the fundamental equations and the hardware thus far described are common between the first embodiment and the second embodiment of the invention, the processing procedures of which are described in the following.

First Embodiment

Figure 8:
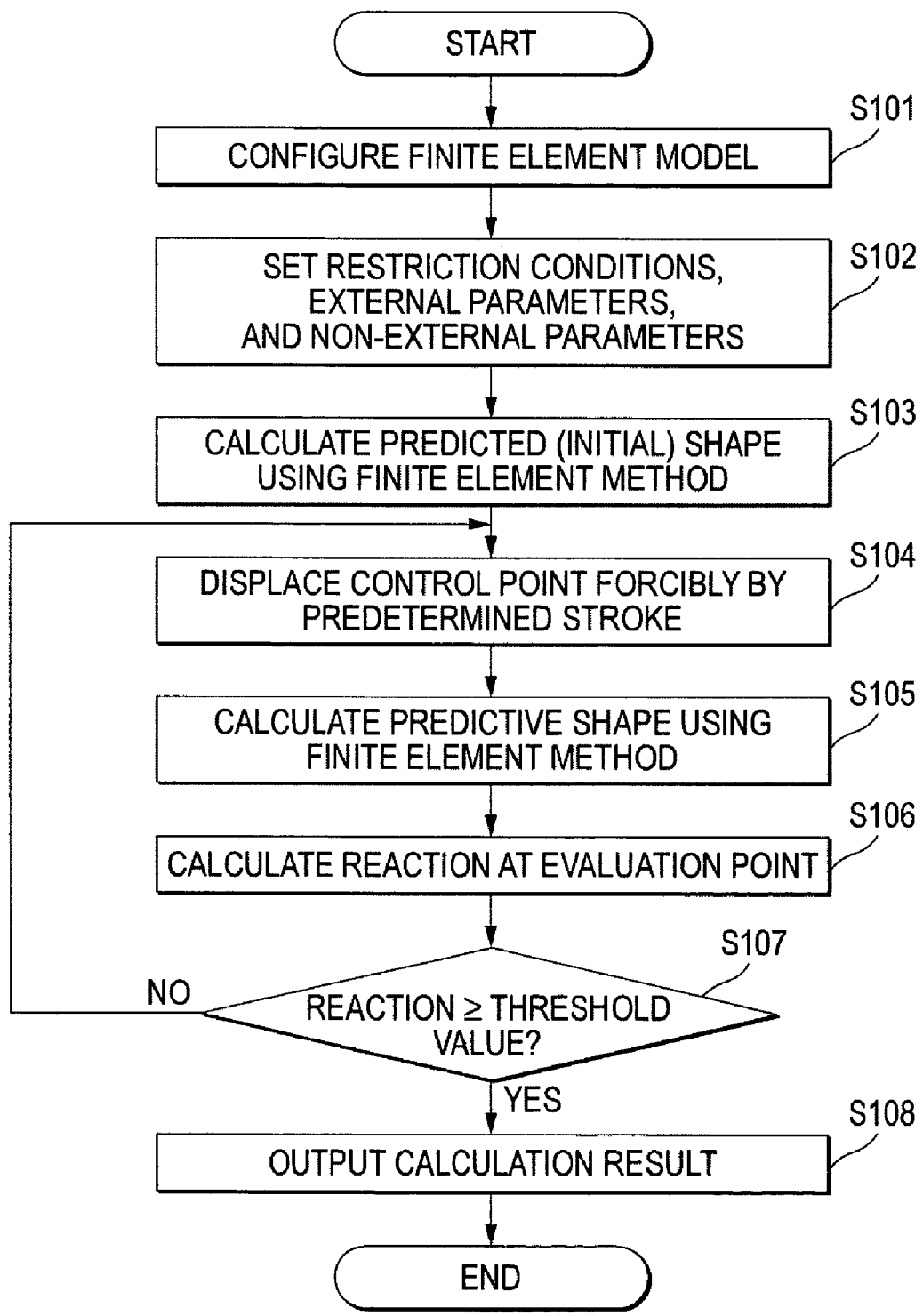
FIG. 8 is a flow chart showing the processing procedure of a first embodiment of the invention.

Subsequently, the processing procedure according to the first embodiment is described with reference to FIG. 8 and FIG. 9. FIG. 8 is a flow chart showing the processing procedure of the first embodiment of the invention. FIG. 9A to FIG. 9C are diagrams showing the states, in which the wire harness is deformed at the individual processing operations of FIG. 8.

At first Step S101 shown in FIG. 8, the finite element model corresponding to the wire harness to be designed is created by the above method. At next Step S102, the created finite element model is set with the restriction conditions, the external parameters and the non-external parameters. At Step S103, the predictive shape or the state, in which the finite element model is physically balanced, according to the set value, that is, an initial shape 1a shown in FIG. 9A, is calculated. Here, the operation of Step S101 corresponds to the finite element model creating step and the finite element model creating unit. On the other hand, the operation of Step S103 corresponds to the predictive shape calculating step and the predictive shape calculating unit.

Supplementarily, individual joints 1a1 to 1a8 are set with the restriction kinds (e.g., the complete restrictions, the rotational restrictions or the complete freedom) shown in FIG. 2, as the restriction conditions to be set at Step S102. To the individual joints 1a1 to 1a8, there are assigned the portions, to which the support members such as the connectors or the clips are attached. For setting the restriction kinds, the names of the support members such as the connectors or the stationary clips may be utilized, as shown in FIG. 2. The individual values set here relate to the individual elements in the displacement vectors $\{x\}$ in the aforementioned equation (3).

Specifically, the restriction conditions for the joints 1a1 and 1a2 are set as complete restrictions, and the restriction conditions for the joints 1a3 to 1a7 are set as complete freedom. Of these, the joint 1a2 is set as the evaluation point for evaluating the reaction to occur. In the following description, therefore, the joint 1a2 may also be called the evaluation point 1a2. The evaluation point corresponds to the portion, to which the slot clip shown in FIG. 2 is attached.

On the other hand, the joint 1a8 is set as the control point to be forcibly displaced. The control point is made to correspond to the portion which is held by the worker at the assembling time, for example. In the following description, therefore, the joint 1a8 may also be called the control point 1a8.

Moreover, the external parameters to be set at Step S102 are the aforementioned length I and the sectional area A, and the non-external parameters are the geometrical moment of inertia I, the polar moment of inertia of area J, the Poisson's ratio $\mu$, the density $\rho$, the modulus of longitudinal elasticity E and the modulus of transverse elasticity G. These parameters utilize the values which are measured or determined in advance in the aforementioned manners. The values set here relate to the individual elements of the rigidity matrix [K] in the aforementioned equation (3). The external parameters and the non-external parameters correspond to the physical properties. Here, the various control values relating to the calculations are also set, although not shown.

Figure 9A:
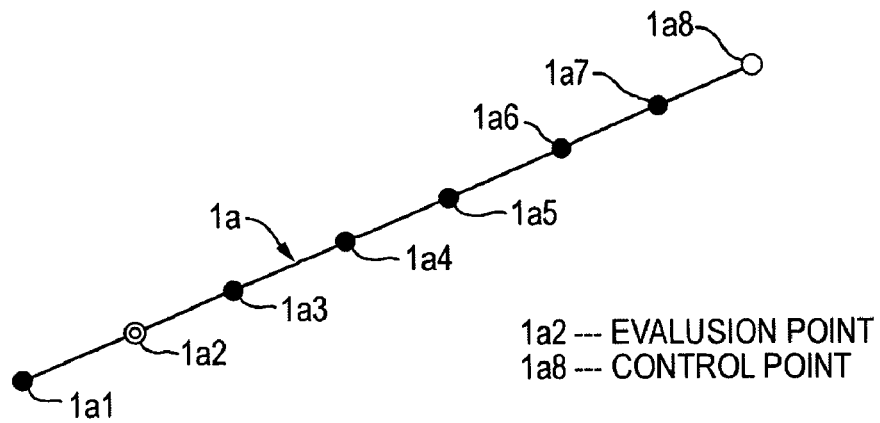
FIG. 9A to FIG. 9C are diagrams showing the states, in which the wire harness is deformed at the individual processing operations of FIG. 8.
Figure 9B:
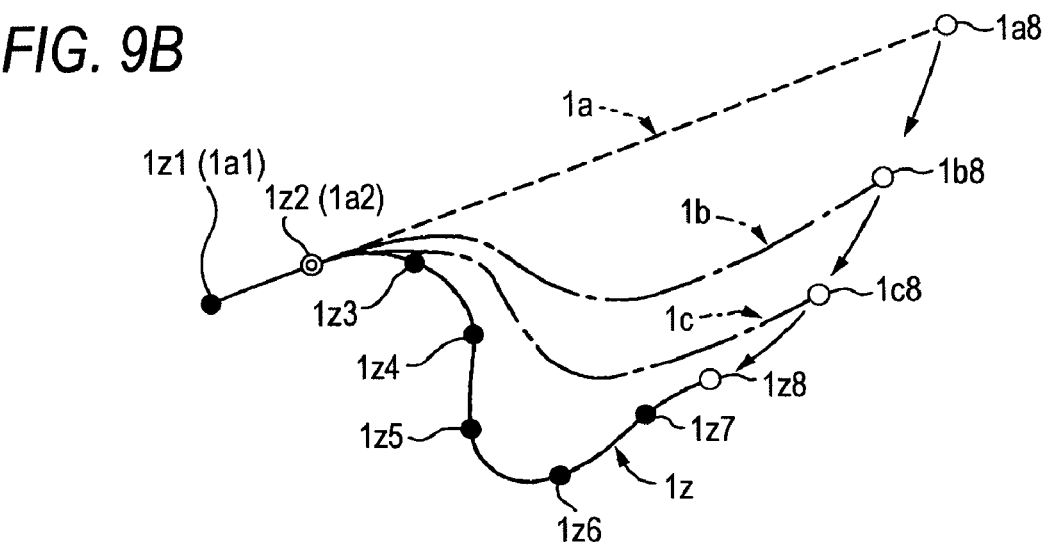
Figure 9C:
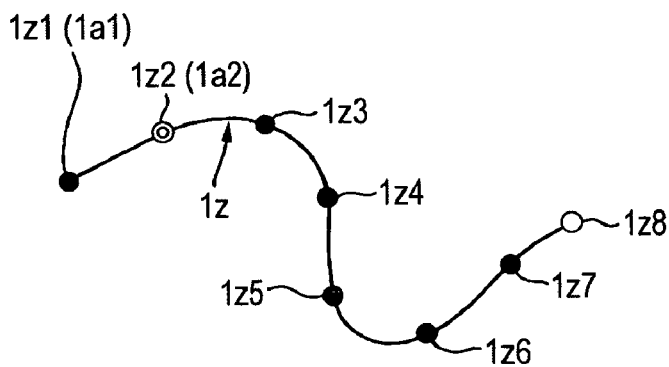

Moreover, the predictive shape or the state, in which the finite element model is physically balanced, according to the set value, that is, the initial shape $1a$ shown in FIG. 9A, is calculated. Here, the restriction conditions are set to correspond to the state, in which the objective wire harness is extended straight, but the restriction conditions may be set for another shape as the initial shape.

When the wire harnesses are shipped from the wire harness maker to a car maker, for example, they are packaged in a container. In case, however, the wire harnesses extracted from the container are to be distributed to the vehicles, their initial shapes vary depending on how they are folded in the container. Imaging those initial shapes, the more practical reaction evaluations can be made by calculating the initial shape $1a$ and by reflecting the shape as a starting point on the predictive shape.

Here, the finite element method need not always be utilized for the calculations of the initial shape. For these calculations, there may be used either the minimum bending radius depending on the material properties of the wire harness or the bending radius, to which the worker can bend the wire harness by his ordinary force, for example. In either event, it is preferred to output the initial shape, on which the shape of the objective wire harness before assembly is reflected. These shape calculating operations are done by the microcomputer 21. The input unit 22 is used for setting the individual values, and the display unit 23 and/or the print unit 24 is used for outputting the predictive shape. In the subsequent procedure, too, the shape calculating operations are done by the microcomputer 21. The input unit 22 is used for setting the individual values, and the display unit 23 is used for outputting the calculated results.

When the settings and the calculations of the initial shape are completed, the procedure proceeds to Step S104, at which the first control point $108a$ is forcibly displaced by a predetermined stroke. This predetermined stroke can be determined by dividing the passed route from the control point $1a8$ on the initial shape $1a$ to a supposed displacement destination $1z8$, as shown in FIG. 9B, into a plurality. That predetermined stroke need not be seriously strict but need be such a small step that the reaction does not suddenly exceed the threshold value with one displacement. The complete restrictions are given as the restriction conditions of the control point $1a8$. As described, the joint $1a1$ is set as a complete restriction, for example, but another joint is set completely free, for example. The external parameters and the non-external parameters remain the values set at Step S102.

Subsequently, the procedure proceeds to Step S105. At Step S105, the predictive shape or the state, in which the finite element model is physically balanced, according to the set value, that is, the initial shape $1b$ shown in FIG. 9B, is calculated. At Step S106, moreover, the reaction at the evaluation point $1a2$ is calculated and is compared at Step S107 with a predetermined threshold value. Here, the operation of Step S105 corresponds to the predictive shape calculating step and the predictive shape calculating unit. Moreover, the operation of Step S106 corresponds to the reaction calculating step and the reaction calculating unit.

Moreover, the operation of Step S107 corresponds to the reaction comparing step and the reaction comparing unit.

While it is decided at Step S107 that the calculated reaction is smaller than the threshold value (i.e., the answer of Step S107 is N), the operations of Step S104 to Step S106 are repeated. If it is decided that the threshold value is reached or overcome (i.e., the answer of Step S107 is Y), the procedure proceeds to Step S108. As the threshold value, there is set the upper limit of the durability of the connector attached to the evaluation point $1a2$, for example. Every times the operations of Step S104 to Step S106 are repeated, it is preferred that the behaviors of the deformations of the predictive shape are successively displayed in the display unit 23, as indicated by $1a$, $1b$, $1c$ and $1z$ in FIG. 9B. It is more preferred that the value of the reaction to occur at the evaluation point $1a2$ is additionally written.

At Step S108, moreover, the calculation results thus far described are outputted. The calculation results are the outputs of the predictive shape $1z$ at the time when the reaction to occur at the evaluation point $1a2$ coincides with the threshold value, and the force applied at this time to the control point $1a8$ (or $1z8$), as shown in FIG. 9C. It is preferred that those calculation results are outputted to not only the display unit 23 but also the print unit 24 or recorded in the recording medium 29. Here, the operation of Step S108 corresponds to the result outputting step and the result outputting unit.

By outputting the predictive shape at the time when the reaction to occur at the evaluation point $1a2$ is deemed to coincide with the predetermined threshold value, as the calculation results, it is possible to easily grasp the predictive shape $1z$ corresponding to the endurance limit of the connector attached to the evaluation point $1a2$, for example. It is, therefore, possible to make the wiring design more efficiently considering the assemblability.

The following modifications can be conceived in addition to the above embodiment, as exemplified with reference to FIG. 8 and FIG. 9. For example, the evaluation point and the control point may be made to coincide (by assigning the joint $1a8$ to both the evaluation point and the control point). This is because the connector is attached to the joint $1a8$ and because the work for the worker to attach the connector to a predetermined place is imagined.

In another modification, it is arbitrary to set a plurality of evaluation points, for example, (by assigning the joints $1a2$ and $1a8$ of FIG. 9A as the evaluation points and the joint $1a4$ as the control point). This is because the connectors are attached to the joints $1a2$ and $1a8$ so that the individual evaluations of the connectors are effectively made at the working time. Moreover, it is arbitrary to set a plurality of control points. In the embodiment of FIG. 8 and FIG. 9, moreover, the support members to be attached to the evaluation points are completely constrained imaging the slot clips. It is, however, arbitrary to set the rotational restrictions imagining the round clips or the like.

In the flow chart of FIG. 8, moreover, the forced displacement is stopped when it is decided that the reaction to occur at the evaluation point $1a2$ exceeds a predetermined threshold value. This decision may be replaced by the successive calculations of the reactions at the evaluation points while continuing the forced displacement till the control point reaches the final forced displacement point.

Second Embodiment

Figure 10:
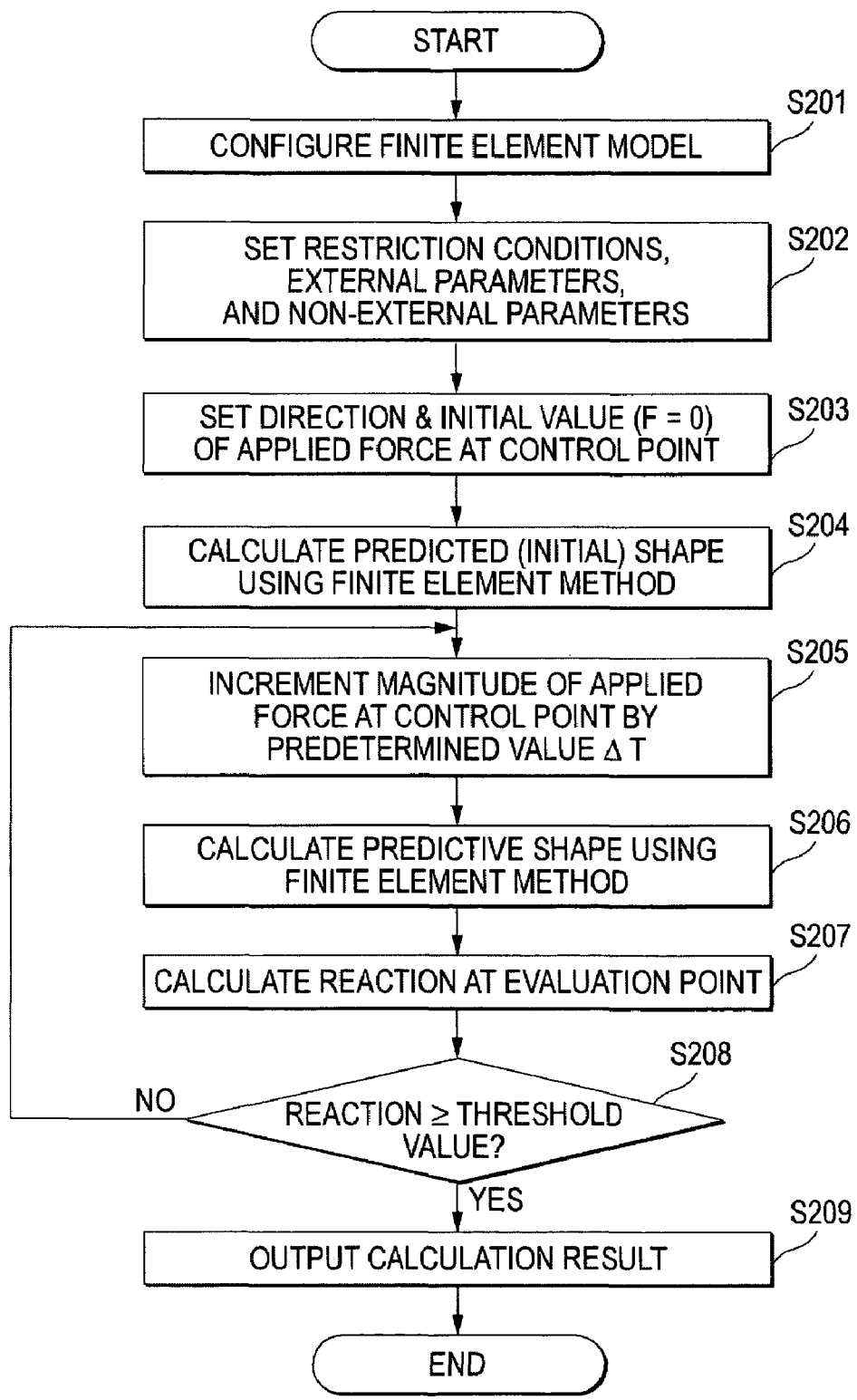
FIG. 10 is a flow chart showing the processing procedure of the second embodiment of the invention.

Subsequently, the processing procedure according to the second embodiment is described with reference to FIG. 10 and FIG. 11. FIG. 10 is a flow chart showing the processing procedure of the second embodiment of the invention. FIG. 11A to FIG. 11C are diagrams showing the states, in which the wire harness is deformed at the individual processing operations of FIG. 10.

At first Step S201 shown in FIG. 10, the finite element model corresponding to the wire harness to be designed is created by the aforementioned method. At next Step S202, the created finite element model is set with the restriction conditions, the external parameters and the non-external parameters. At Step S203, the predictive shape or the state, in which the finite element model is physically balanced, according to the set value, that is, an initial shape $1a'$ shown in FIG. 11A, is calculated. Here, the operation of Step S201 corresponds to the finite element model creating step and the finite element model creating unit. On the other hand, the operation of Step S204 corresponds to the predictive shape calculating step and the predictive shape calculating unit.

Supplementarily, individual joints $1a1'$ to $1a8'$ are set with the restriction kinds (e.g., the complete restrictions, the rotational restrictions or the complete freedom) shown in FIG. 2, as the restriction conditions to be set at Step S202. To the individual joints $1a1'$ to $1a8'$, there are assigned the portions, to which the support members such as the connectors or the clips are attached. For setting the restriction kinds, the names of the support members such as the connectors or the stationary clips may be utilized, as shown in FIG. 2. The individual values set here relate to the individual elements in the displacement vectors $\{x\}$ in the aforementioned equation (3).

Specifically, the restriction conditions for the joints $1a1'$ and $1a2'$ are set as complete restrictions, and the restriction conditions for the joints $1a3'$ to $1a7'$ are set as complete freedom. Of these, the joint $1a2'$ is set as the evaluation point for evaluating the reaction to occur. In the following description, therefore, the joint $1a2'$ may also be called the evaluation point $1a2'$. The evaluation point corresponds to the portion, to which the slot clip shown in FIG. 2 is attached.

On the other hand, the joint $1a8'$ is set as the control point to be forcibly displaced. The control point is made to correspond to the portion which is held by the worker at the assembling time, for example. In the following description, therefore, the joint $1a8'$ may also be called the control point $1a8'$.

Moreover, the external parameters to be set at Step S202 are the aforementioned length I and the sectional area A, and the non-external parameters are the geometrical moment of inertia I, the polar moment of inertia of area J, the Poisson's ratio $\mu$, the density $\rho$, the modulus of longitudinal elasticity E and the modulus of transverse elasticity G. These parameters utilize the values which are measured or determined in advance in the aforementioned manners. The values set here relate to the individual elements of the rigidity matrix [K] in the aforementioned equation (3). The external parameters and the non-external parameters correspond to the physical properties. Here, the various control values relating to the calculations are also set, although not shown.

Figure 11A:
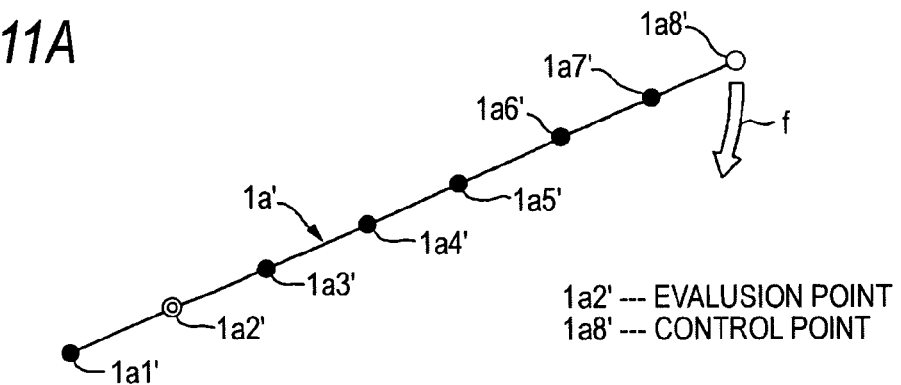
FIG. 11A to FIG. 11C are diagrams showing the states, in which the wire harness is deformed at the individual processing operations of FIG. 10.
Figure 11B:
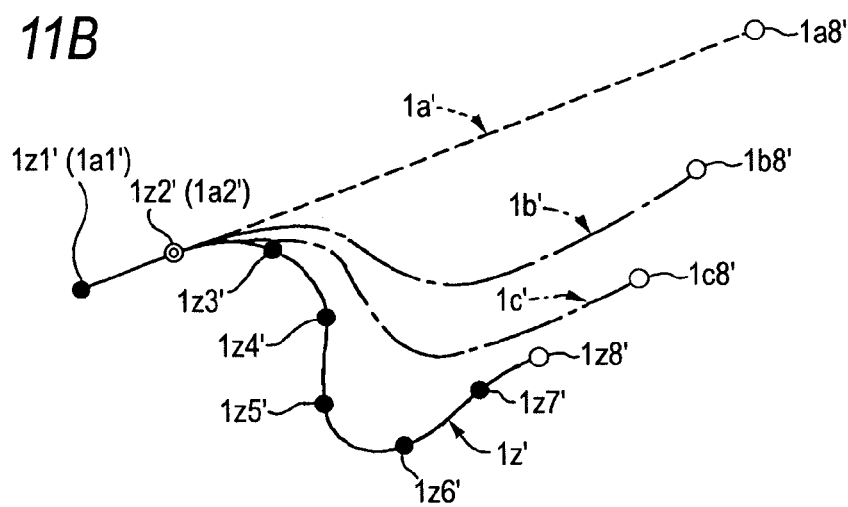
Figure 11C:
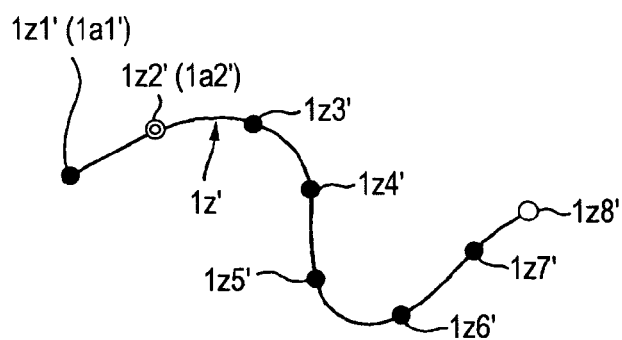

As the direction and initial value of the force to be set at Step S203, on the other hand, there are set the force and initial value of a force f to be applied to the joint $1a8'$ of FIG. 11A. At this stage, for example, the initial value of the force to be applied is set with zero, and the direction of the force f to be applied is exclusively set. The direction of this force f is based on the motions or the like of the worker to be anticipated at the assembling time, for example. The value of the force f relates to the individual components of a force vector [f] in the aforementioned equation (3).

Moreover, the predictive shape or the state, in which the finite element model is physically balanced, according to the set value, that is, the initial shape $1a'$ shown in FIG. 11A, is calculated. Here, the aforementioned restriction conditions are set to correspond to the state, in which the objective wire harness is extended straight, but the restriction conditions may be set for another shape as the initial shape.

When the wire harnesses are shipped from the wire harness maker to a car maker, for example, they are packaged in a container. In case, however, the wire harnesses extracted from the container are to be distributed to the vehicles, their initial shapes vary depending on how they are folded in the container. Imaging those initial shapes, the more practical reaction evaluations can be made by calculating the initial shape $1a'$ and by reflecting the shape as a starting point on the predictive shape.

Here, the finite element method need not always be utilized for the calculations of the initial shape. For these calculations, there may be used either the minimum bending radius depending on the material properties of the wire harness or the bending radius, to which the worker can bend the wire harness by his ordinary force, for example. In either event, it is preferred to output the initial shape, on which the shape of the objective wire harness before assembly is reflected. These shape calculating operations are done by the microcomputer 21. The input unit 22 is used for setting the individual values, and the display unit 23 and/or the print unit 24 is used for outputting the predictive shape. In the subsequent procedure, too, the shape calculating operations are done by the microcomputer 21. The input unit 22 is used for setting the individual values, and the display unit 23 is used for outputting the calculated results.

When these settings and the calculations of the initial shape are completed, the procedure proceeds to Step S205, at which the magnitude of the applied force at the control point $1a8'$ is increased by a predetermined value $\Delta$ f. The procedure further proceeds to Step S206, at which the predictive shape by the magnitude of the force is calculated by utilizing the finite element method. The value to be set at Step S205 relates to the individual elements in the force vector [f] in the aforementioned equation (3). Here, the set values other than the magnitude of another force to be applied are assumed to be unvaried. At Step S207, the reaction at the evaluation point $1a2'$ is calculated and is compared at Step S208 with the predetermined threshold value. Here, the operation of Step S206 corresponds to the predictive shape calculating step and the predictive shape calculating unit. Moreover, the operation of Step S207 corresponds to the reaction calculating step and the reaction calculating unit. Moreover, the operation of Step S208 corresponds to the reaction comparing step and the reaction comparing unit.

At Step S205, the force is gradually changed in magnitude and applied to the control point $1a8'$ while being fixed in direction. As a result, it is to continuously grasp the relation between the force to be applied to the control point $1a8'$ and the reaction to occur at the evaluation point $1a8'$. This makes it possible to efficiently design the optimum wiring of the objective wire harness. Here, the operation of Step S205 corresponds to the adjusting step.

While it is decided at Step S208 that the calculated reaction is smaller than the threshold value (i.e., the answer of Step S208 is N), the operations of Step S205 to Step S207 are repeated. If it is decided that the threshold value is reached or overcome (i.e., the answer of Step S208 is Y), the procedure proceeds to Step S209. As the threshold value, there is set the upper limit of the durability of the connector attached to the evaluation point 1a2', for example. Every times the operations of Step S205 to Step S207 are repeated, it is preferred that the behaviors of the deformations of the predictive shape are successively displayed in the display unit 23, as indicated by 1a', 1b', 1c' and 1z' in FIG. 11B. It is more preferred that the value of the reaction to occur at the evaluation point 1a2' is additionally written.

At Step S209, moreover, the calculation results thus far described are outputted. The calculation results are the outputs of the predictive shape 1z' at the time when the reaction to occur at the evaluation point 1a2' coincides with the threshold value, and the force applied at this time to the control point 1a8' (or 1z8'), as shown in FIG. 11C. It is preferred that those calculation results are outputted to not only the display unit 23 but also the print unit 24 or recorded in the recording medium 29. Here, the operation of Step S209 corresponds to the result outputting step and the result outputting unit.

By outputting the predictive shape at the time when the reaction to occur at the evaluation point 1a2' is deemed to coincide with the predetermined threshold value, as the calculation results, it is possible to easily grasp the predictive shape 1z' corresponding to the endurance limit of the connector attached to the evaluation point 1a2', for example. As the calculation result, there is outputted the force which has been applied to the control point 1a8' at the time when the reaction to occur at the evaluation point 1a2' is deemed to coincide with the threshold value. Then, it is easily possible to grasp such a force as can be applied to the control point 1a8' while satisfying the durable range of the connector to be applied to the evaluation point 1a2'. It is, therefore, possible to make the wiring design more efficiently considering the assemblability.

The following modifications can be conceived in addition to the aforementioned embodiment, as exemplified with reference to FIG. 10 and FIG. 11. For example, the evaluation point and the control point may be made to coincide (by assigning the joint 1a8' to both the evaluation point and the control point). This is because the connector is attached to the joint 1a8' and because the work for the worker to attach the connector to a predetermined place is imagined. In this case, the ordinary force of the worker, for example, is set as the threshold value. In this case, it is possible to grasp the movable range of the connector which can be attached by the ordinary force to the desired position, and to decide the mountability of the connector more easily.

In another modification, it is arbitrary to set a plurality of evaluation points, for example, (by assigning the joints 1a2' and 1a8' of FIG. 11A as the evaluation points and the joint 1a4' as the control point). This is because the connectors are attached to the joints 1a2' and 1a8' so that the individual evaluations of the connectors are effectively made at the working time. Moreover, it is arbitrary to set a plurality of control points. In the embodiment of FIG. 10 and FIG. 11, moreover, the support members to be attached to the evaluation points are completely constrained imaging the slot clips. It is, however, arbitrary to set the rotational restrictions imagining the round clips or the like.

According to the embodiments of the invention, as has been described hereinbefore, the reaction to occur at the predetermined evaluation point of the linear structure such as the wire harness is evaluated at the time when the predetermined control point on the linear structure is forcibly displaced or when the force is applied to the predetermined control point. As a result, it is easily possible to grasp the moving range of the control point, to decide the mountability of the support member such as the connector, and to evaluate the durability of the support member such as the connector. This makes it possible to efficiently design the optimum wiring of the objective linear structure.

Here, the invention has been described by way of an example of the wire harness wired as the linear structure in the vehicle. Nevertheless, the invention can naturally be applied not only to such wire harness but also to the hose or tube, which has a simpler structure than that of the wire harness and which is arranged outside of the vehicle, or a general electric wire or a single electric wire. In short, the linear structure of the invention includes those hose, tube, general electric wire and single electric wire. Moreover, the invention can also be applied to the wire harness having branches. In addition, the invention can also be likewise applied to the linear structure having not only the circular section but also a rectangular section, an annular section, an elliptical section and an H-shaped section. In short, the linear structure, to which the invention is applied, should not be limited to the circular section.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2004-080037 filed on Mar. 19, 2004, the content of which is incorporated herein for reference.

What is claimed is:

1. A method of supporting an optimum wiring design of a linear structure, comprising:
   providing a finite element model of the linear structure, the finite element model being formed as an elastic body having a plurality of combined beam elements which retain linearity;
   setting a physical property and restriction conditions of the linear structure to the finite element model;
   calculating a predictive shape of the finite element model which is in a physically balanced condition based on the physical property and the restriction conditions;
   calculating a reaction at a predetermined evaluation point of the predictive shape;
   comparing the reaction with a predetermined threshold value; and
   outputting a comparison result of the reaction comparing process,
   wherein the calculating process of the predictive shape calculates the predictive shape by setting a forced displacement destination of a predetermined control point of the linear structure as one of the restriction conditions, to the finite element model.

2. The method as set forth in claim 1, wherein the outputting process outputs the predictive shape in a state that the reaction coincides with the threshold value as the comparison result.

3. The method as set forth in claim 1, wherein the evaluation point coincides with the control point.

4. A method of supporting an optimum wiring design of a linear structure, comprising:
   providing a finite element model of the linear structure, the finite element model being formed as an elastic body having a plurality of combined beam elements which retain linearity;
   setting a physical property and restriction conditions of the linear structure to the finite element model;

calculating a predictive shape of the finite element model which is in a physically balanced condition based on the physical property and the restriction conditions;

calculating a reaction at a predetermined evaluation point of the predictive shape;

comparing the reaction with a predetermined threshold value; and outputting a comparison result of the reaction comparing process, wherein the calculating process of the predictive shape calculates the predictive shape by setting the magnitude and direction of a force which is applied to a predetermined control point of the linear structure, in addition to the physical property and the restriction conditions, to the finite element model.

5. The method as set forth in claim 4, wherein the outputting process outputs the predictive shape in a state that the reaction coincides with the threshold value as the comparison result.

6. The method as set forth in claim 4, wherein the evaluation point coincides with the control point.

7. The method as set forth in claim 4, wherein the outputting process outputs the force which is applied to the predetermined control point of the linear structure in a state that the reaction coincides with the threshold value as the comparison result.

8. The method as set forth in claim 4, further comprising an adjusting process which applies the force to the control point so as to change the magnitude of the force gradually while keeping the direction of the force constant.

9. A supporting apparatus for supporting an optimum wiring design of a linear structure, comprising:

a providing unit which provides a finite element model of the linear structure, the finite element model being formed as an elastic body having a plurality of combined beam elements which retain linearity;

a setting unit which sets a physical property and restriction conditions of the linear structure to the finite element model;

a first calculating unit which calculates a predictive shape of the finite element model which is in a physically balanced condition based on the physical property and the restriction conditions;

a second calculating unit which calculates a reaction at a predetermined evaluation point of the predictive shape;

a comparing unit which compares the reaction with a predetermined threshold value; and an outputting unit which outputs a comparison result by the comparing unit, wherein the first calculating unit calculates the predictive shape by setting a forced displacement destination of a predetermined control point of the linear structure as one of the restriction conditions, to the finite element model.

10. A supporting apparatus for supporting an optimum wiring design of a linear structure, comprising:

a providing unit which provides a finite element model of the linear structure, the finite element model being formed as an elastic body having a plurality of combined beam elements which retain linearity;

a setting unit which sets a physical property and restriction conditions of the linear structure to the finite element model;

a first calculating unit which calculates a predictive shape of the finite element model which is in a physically balanced condition based on the physical property and the restriction conditions;

a second calculating unit which calculates a reaction at a predetermined evaluation point of the predictive shape;

a comparing unit which compares the reaction with a predetermined threshold value; and an outputting unit which outputs a comparison result by the comparing unit, wherein the first calculating unit calculates the predictive shape by setting the magnitude and direction of a force which is applied to a predetermined control point of the linear structure, in addition to the physical property and the restriction conditions, to the finite element model.

11. A computer-readable recording medium for causing a computer to execute the method of supporting an optimum wiring design of a linear structure set forth in any one of claims 1 to 3.

12. A computer-readable recording medium for causing a computer to execute the method of supporting an optimum wiring design of a linear structure set forth in any one of claims 4 to 8.

* * * * *